United States Patent
Xu (10) Patent No.: US 7,031,440 B1
(45) Date of Patent: Apr. 18, 2006

(54) INTERACTIVE VOICE RESPONSE SYSTEMS WITH GENERAL-PURPOSE BLOCKS

(75) Inventor: Xinzhong Leon Xu, San Jose, CA (US)

(73) Assignee: Ssimens Communications Inc., Boca Raton, FL (US)

( * ) Notice: Subject to any disclaimer, the term of this patent is extended or adjusted under 35 U.S.C. 154(b) by 0 days.

(21) Appl. No.: 09/241,335

(22) Filed: Feb. 1, 1999

(51) Int. Cl.
*H04M 11/00* (2006.01)

(52) U.S. Cl. .................. 379/88.16; 379/88.18

(58) Field of Classification Search .......... 379/67.1, 379/88.16, 88.17, 88.18; 377/201.01, 201.02, 377/201.03, 221.01, 221.06
See application file for complete search history.

(56) References Cited

U.S. PATENT DOCUMENTS

| | | | | |
|---|---|---|---|---|
| 4,602,129 A | * | 7/1986 | Matthews et al. | 179/18 B |
| 5,416,830 A | | 5/1995 | MacMillan, Jr. et al. | 379/88 |
| 5,488,650 A | * | 1/1996 | Greco et al. | 379/67 |
| 5,740,231 A | | 4/1998 | Cohn et al. | 379/89 |
| 5,802,526 A | | 9/1998 | Fawcett et al. | 707/104 |
| 5,825,856 A | | 10/1998 | Porter et al. | 379/93.12 |
| 5,850,429 A | | 12/1998 | Joyce et al. | 379/88 |
| 5,913,195 A | * | 6/1999 | Weeren et al. | 704/270 |
| 6,044,142 A | * | 3/2000 | Hammarstrom et al. | 379/201.01 |
| 6,314,164 B1 | * | 11/2001 | Johnson | 379/67.1 |
| 6,463,130 B1 | * | 10/2002 | Malik | 379/88.22 |
| 6,647,111 B1 | * | 11/2003 | Bjornberg et al. | 379/220.01 |

FOREIGN PATENT DOCUMENTS

| | | |
|---|---|---|
| WO | 9618260 | 6/1996 |
| WO | 9850907 | 11/1998 |

OTHER PUBLICATIONS

"Interactive Voice Response," 1998, Miller Freeman.
Luz Saturnino: "State of the Art Survey of Existing Dialogue Management Tools", HTTP://www.disc2.dk/tools/D2.7A/D27A.html, Online? Nov. 24, 199, XP002142225.

* cited by examiner

*Primary Examiner*—Ovidio Escalante (57) ABSTRACT

Techniques for generating interactive voice response systems are provided. Multiple interconnected general-purpose blocks can be configured for a specific IVR application. Each general purpose block can include prompts and logic for receiving input. By utilizing general-purpose blocks, complex IVR applications can be quickly and efficiently generated. Additionally, IVR applications can be upgraded and maintained during run-time.

21 Claims, 10 Drawing Sheets

INTERACTIVE VOICE RESPONSE SYSTEMS WITH GENERAL-PURPOSE BLOCKS

BACKGROUND OF THE INVENTION

The present invention relates to interactive voice response (IVR) systems. More particularly, the invention relates to interactive voice response systems that include multiple general-purpose blocks.

As technology advances, more and more functions that are traditionally performed by human beings are being performed by machines. As an example, receptionists were the standard at almost any level of business to answer phone calls and direct them to the intended recipient. However, today it is very common for machines to perform the functions of a receptionist. When one calls a number, a machine often prompts the caller with a number of choices, which the caller can select with the buttons of a touch tone phone.

The electronic receptionist described above is a simple example of an IVR system. IVR systems are increasingly becoming more and more complex and can perform functions including voice processing, fax processing, call switching, call management, and the like. As may be expected, the complexities of the IVR systems provide more flexibility but also make building and maintaining an IVR system much more difficult.

IVR systems can be created using scripting languages. A scripting language is a relatively simple programming language that is designed for a specific task. The logical flow of an IVR system can be defined using sequential statements of the scripting language (e.g., javascript). Typically, the script statements are compiled into a software application that runs the IVR system.

Although scripting languages can be fairly powerful, they have several drawbacks. Most scripting languages are designed to resemble programming languages in order to reduce the learning curve for script programmers. However, this makes it difficult for one who is not a programmer to create, modify and generally maintain the IVR system. Additionally, if the software application is compiled from a script program, the IVR system will have to be terminated or "brought down" in order to update the software application with any changes.

Figure 1:
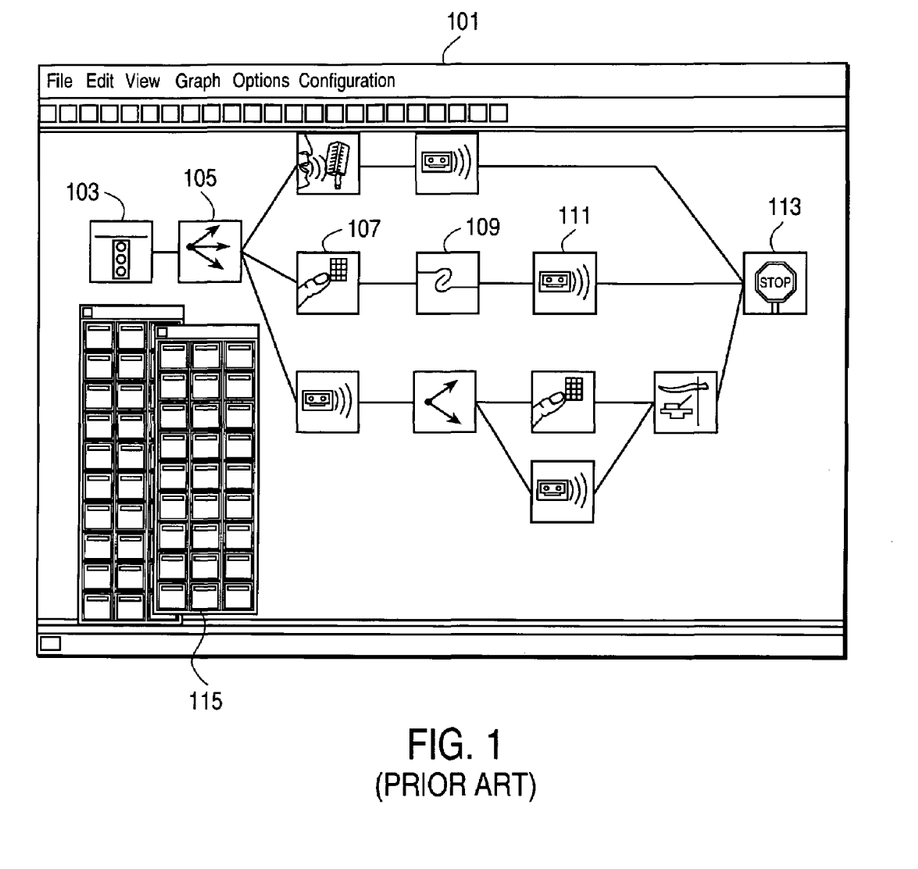
FIG. 1 shows an application generator of the prior art.

IVR systems can also be created by the use of graphical application generators. Application generators commonly include a library of predefined software modules represented by graphical icons that the user is able to select and connect in order to build the software application. FIG. 1 shows an example of an application generator for building an IVR system. As shown, a window 101 includes multiple interconnected graphical icons, providing an application generated from the interconnected predefined modules.

A graphical icon 103 is the point in which the software application begins. A graphical icon 105 is a branch that allows the flow of execution to proceed along multiple paths. Taking the middle path, a graphical icon 107 allows the user to enter his or her personal identification number (PIN), which is verified at a graphical icon 109. A message is played to the user at a graphical icon 111 and the software application exits at a graphical icon 113.

The particular logic flow of the software application shown in FIG. 1 is not as important as understanding how the application generator works. In general, a user selects a desired icon from an icon window 115. The selected icon is displayed on the screen and the user is able to connect the icon to other graphical icons. Additionally, the user may be able to define the specific characteristics of an icon. For example, the user may be able to specify the conditions upon which the graphical icon 105 will branch to each of the possible branch options.

Although application generators make creating and maintaining IVR systems easier, they still can be difficult to master. For example, there are possibly over 50 graphical icons shown in FIG. 1, with each icon being designed for a specific purpose. Although the graphical image of the icons may aid the user's understanding of the function that is provided, it still may be difficult to fully master the power and capabilities provided. Additionally, once the application is configured, the application generator generates an executable software module that needs to be executed in order to have the application run and perform the functions the user has configured. If there is a change in the configuration, the application generator needs to generate the executable software module that executes the newly modified version of the application before the configuration change takes effect. However, in systems that require non-stop operation, it is not practical to terminate an old version of the application so that the newly modified version can be started. This can make it difficult to modify a running IVR system because the running software application may need to be brought down, in order to install the updated version.

SUMMARY OF THE INVENTION

The present invention provides innovative techniques for creating and maintaining IVR systems. In general, an IVR system can include multiple general-purpose blocks, where each general-purpose block can be configured to perform one or more functions. By utilizing general-purpose blocks, an IVR system can be developed quickly and easily maintained. Additionally, in some embodiments, the IVR system can be updated during run-time, making it unnecessary to bring down the system to perform the update. Several embodiments of the invention are described below.

In one embodiment, the invention provides an interactive voice response system including multiple general-purpose blocks. Each general-purpose block is coupled to at least one other general-purpose block and plays a prompt. Additionally, each general-purpose block is configurable to send a first signal after playing the prompt or send a second signal according to received input after playing the prompt. Transfer blocks can be utilized to receive one of the first or second signals from a general-purpose block to transfer a call to a specified telephone number. In preferred embodiments, the general-purpose blocks receive dual tone multiple frequency (DTMF) input representing a key or a string of keys.

In another embodiment, the present invention provides a method of generating an interactive voice response application including providing multiple general-purpose blocks. Each general-purpose block is preconfigured to send signals to at least one other general-purpose block. A general-purpose block is selected and a prompt that the selected general-purpose block will play is specified. Additionally, it is specified whether the selected general purpose block will send a first signal after playing the prompt or send a second signal according to received input after playing the prompt. An error prompt can be specified so that the selected general-purpose blocks will play the error prompt if there is an error in the received input.

In another embodiment, the invention provides a method of modifying an interactive voice response system at runtime. The system, including multiple general-purpose blocks, is executed while the system continues running. A configuration of a selected general-purpose block is modified and the configuration of the selected general-purpose block is updated at run-time. In preferred embodiments, a configuration parameter is stored in a database, such as a WINDOWS registry.

Other features and advantages of the invention will become readily apparent upon review of the following description in association with the accompanying drawings.

DETAILED DESCRIPTION OF SPECIFIC EMBODIMENTS

The following description is presented to enable one of ordinary skill in the art to make and use the invention. In this context, specific embodiments will be described that can be utilized to generate IVR applications. However, the invention is not limited to any particular language, computer architecture or specific implementation. Therefore, the description of the embodiments that follows is for purposes of illustration and not limitation.

Embodiments of the present invention utilize general-purpose blocks, which can be used in conjunction with function-specific blocks (e.g., transfer blocks) if desired. A "general purpose block" is a block that can be configured to perform one or more of multiple functions. In other words, the purpose or function of the general purpose block can change depending on how the block is configured. Although the below description is primarily discussed with respect to interactive voice response units, telephones, and DTMF tones, etc., it should be recognized that the present invention in other specific embodiments has application to automatic call distribution systems (ACDs), telephony devices such as telephony-enabled computers or H.323 phones used in telephony-over-LAN (ToL) systems.

Figure 2A:
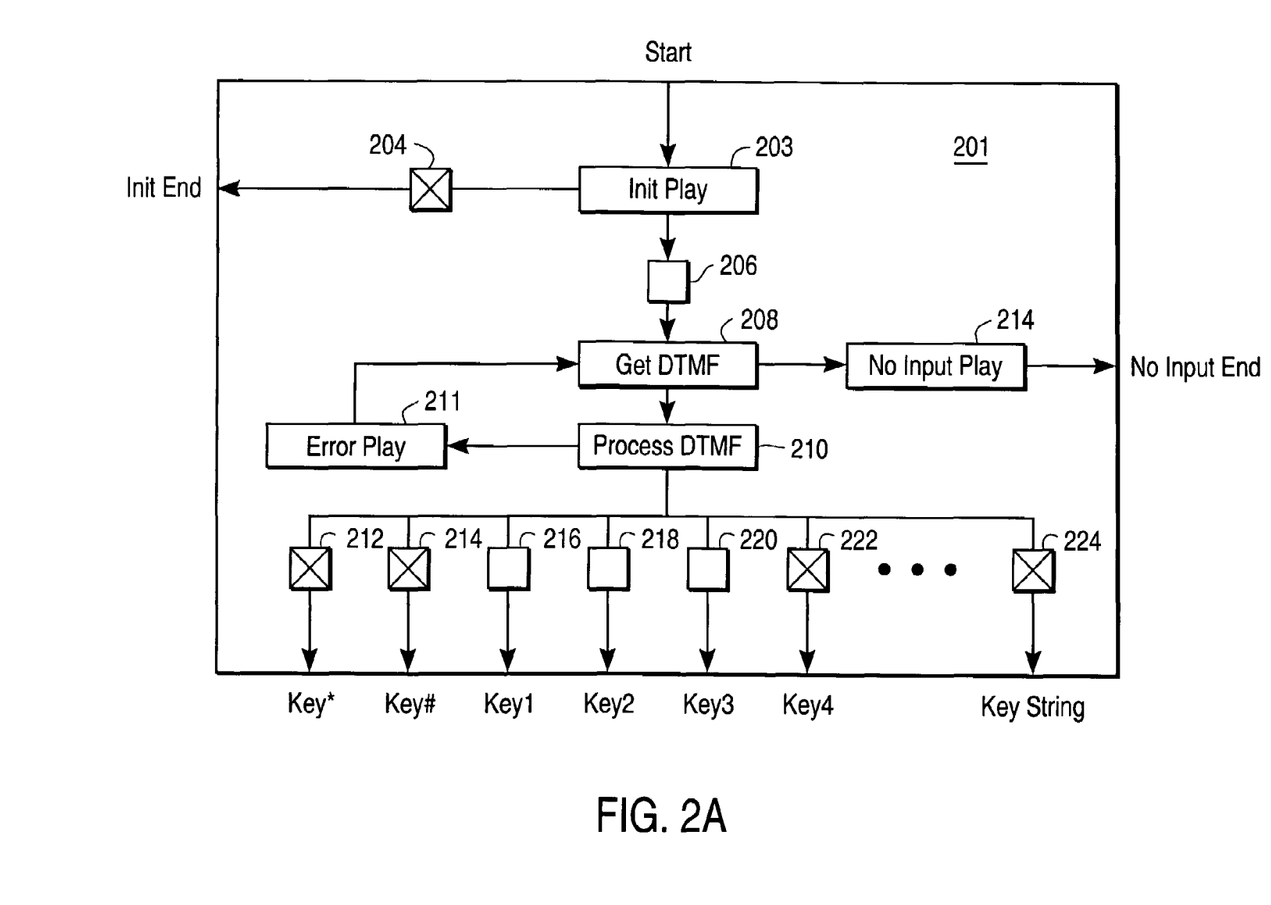
FIGS. 2A and 2B show embodiments of general-purpose blocks of the present invention.

FIG. 2A shows a specific embodiment of a general-purpose block that can be utilized with the present invention. A general-purpose block 201 can receive a Start signal that directs the general-purpose block to begin executing. General-purpose block 201 begins execution by playing a prompt InitPlay 203. The prompt is typically a voice message generated by the IVR application.

General-purpose block 201 can be configured to send a first signal after playing prompt 203 or send a second signal according to received input after playing prompt 203. The configurability of general-purpose block 201 is shown utilizing boxes that can be empty to show that the path is valid or that can be closed (e.g., with an "X") to show the path is not valid under the current configuration.

A box 204 indicates that a signal InitEnd can be sent after prompt 203 is played. The InitEnd will be sent if box 204 is configured as empty meaning that this path is configured as valid. As shown in this example, box 204 is closed, indicating that the valid path would proceed through a box 206 which is empty. In a preferred embodiment, boxes 204 and 206 are mutually exclusive such that the general-purpose block can be configured to play a prompt and then send a signal or play a prompt and process received input (and subsequently send a signal). When boxes 204 and 206 are configured to play the prompt and process received input, prompt 203 is typically a voice message. In other embodiments such as in ToL systems, a video message or an audiovisual message can be played for prompt 203.

Prompt 203 will typically be a voice message that instructs the user what options are available and/or what types of input are valid. For example, prompt 203 can provide the user with a menu of choices and indicate that the user should select "1" if option 1 is desired, select "2" if option 2 is desired, and so forth. Additionally, prompt 203 can instruct the user to enter a string (e.g., a social security number) and may inform the user that a special character (e.g., "#") indicates that input is complete.

A box GetDTMF 208 detects user input. IVR applications can receive input from users that includes voice messages and tones. The "tones" generated by a touch tone phone are dual tone multiple frequency (DTMF) tones. For simplicity, embodiments of the invention will be described as receiving DTMF tones as would be fairly typical for an IVR application. However, embodiments of the invention can also receive voice instructions that are interpreted utilizing voice recognition techniques that are known in the art. Still further embodiments, such as those in ToL systems, can receive typed-in characters/numbers that correspond to the name/extension of a user or selected icons that correspond to the address of a user.

Once input is received, the input is processed at a box ProcessDTMF 210. Processing the input can include determining if there was an error with the input. For example, if prompt 203 provides a menu to the user in which only certain keys are valid, an error may be detected in the input if the user enters an invalid key. As another example, prompt 203 may tell the user to input a social security number and an error may be detected if a user enters less than 9 numbers.

If an error in the input is detected, a prompt ErrorPlay 211 can be played in order to notify the user that the input was invalid and general purpose block 201 proceeds to attempt to receive valid input. If after a predetermined amount of time no input is received, a prompt NoInputPlay 214 can be played to notify the user that no input was received. A signal NoInputEnd can then be sent.

Figure 2B:
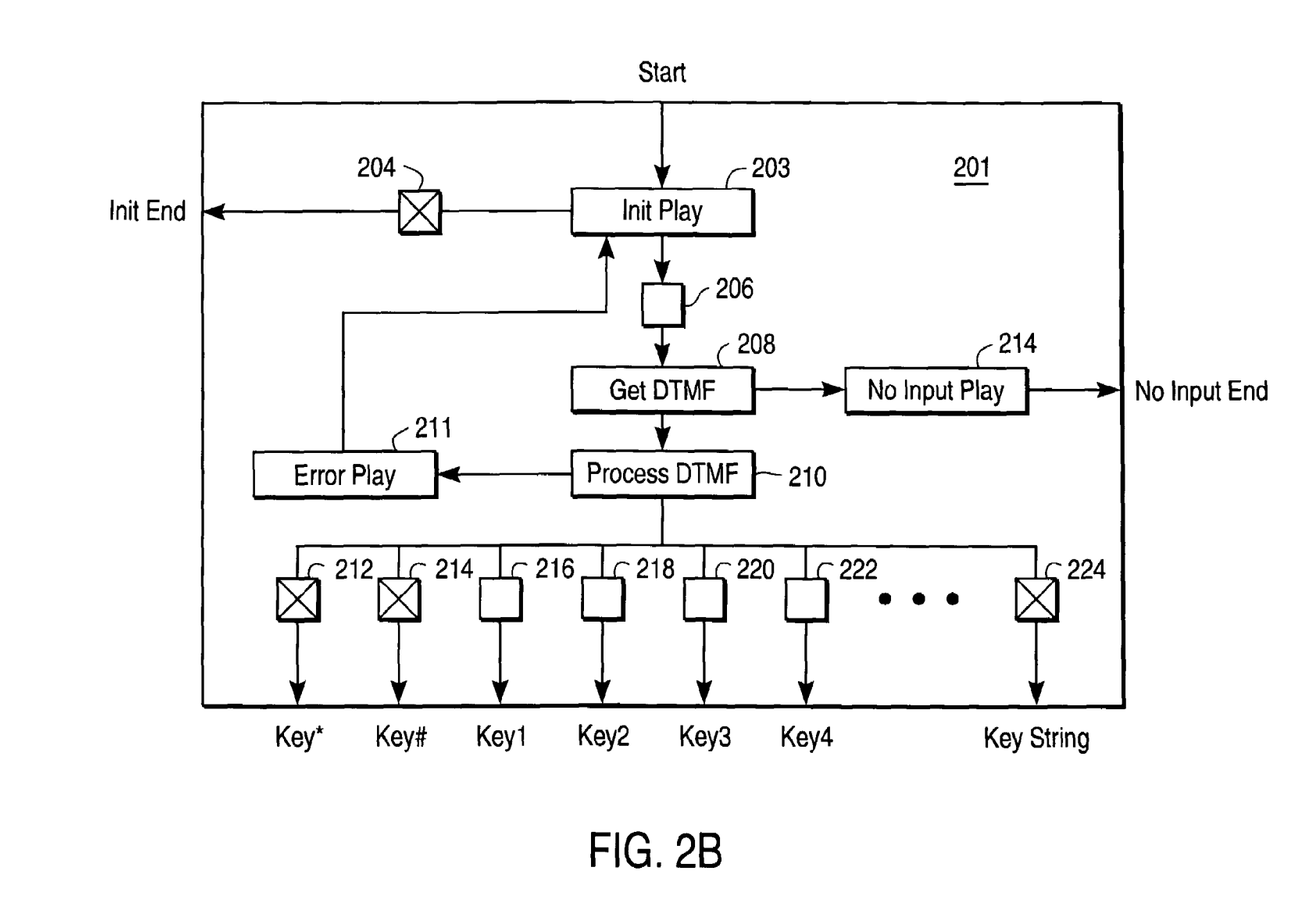

If valid input is received, general-purpose block 201 sends a signal according to the received input. As shown, blocks 212, 214, 216, 218, 220, 222, and 224 are in a path to a signal corresponding to a key or string. If the boxes are empty, this indicates that the path is valid and a closed box indicates an invalid path as described above. As shown in this example, boxes 216, 218 and 220 are empty, which indicates the valid input includes keys "1", "2" and "3" as in a 3-item selection menu. The signals that general-purpose block 201 sends according to received input can correspond to the keys on a touch-tone phone as shown on the bottom of FIG. 2A and also include a string of keys for input that includes multiple keys. In other embodiments, the received input can correspond to typed-in FIG. 2B shows another specific embodiment of a general-purpose block that can be utilized with the present invention. The same reference numerals are utilized to represent similar structures in FIGS. 2A and 2B. As described above in reference to FIG. 2A, prompt 211 (ErrorPlay) is played if an error is detected in the input. However, in the general-purpose block shown in FIG. 2B, after prompt 211 is played, prompt 203 is played. This arrangement can be beneficial, for example, because prompt 211 can inform the user of the error and prompt 203 can be replayed to provide the menu to the user.

In a preferred embodiment, the general-purpose blocks are implemented as objects in an object-oriented environment. Accordingly, the general-purpose blocks send or raise signals to other blocks as has been described. However, the invention is not limited to object-oriented environments and can be advantageously applied to other environments, including non-object-oriented environments. In non-object-oriented environments, for example, the general-purpose blocks can make a call to another block.

Figure 3A:
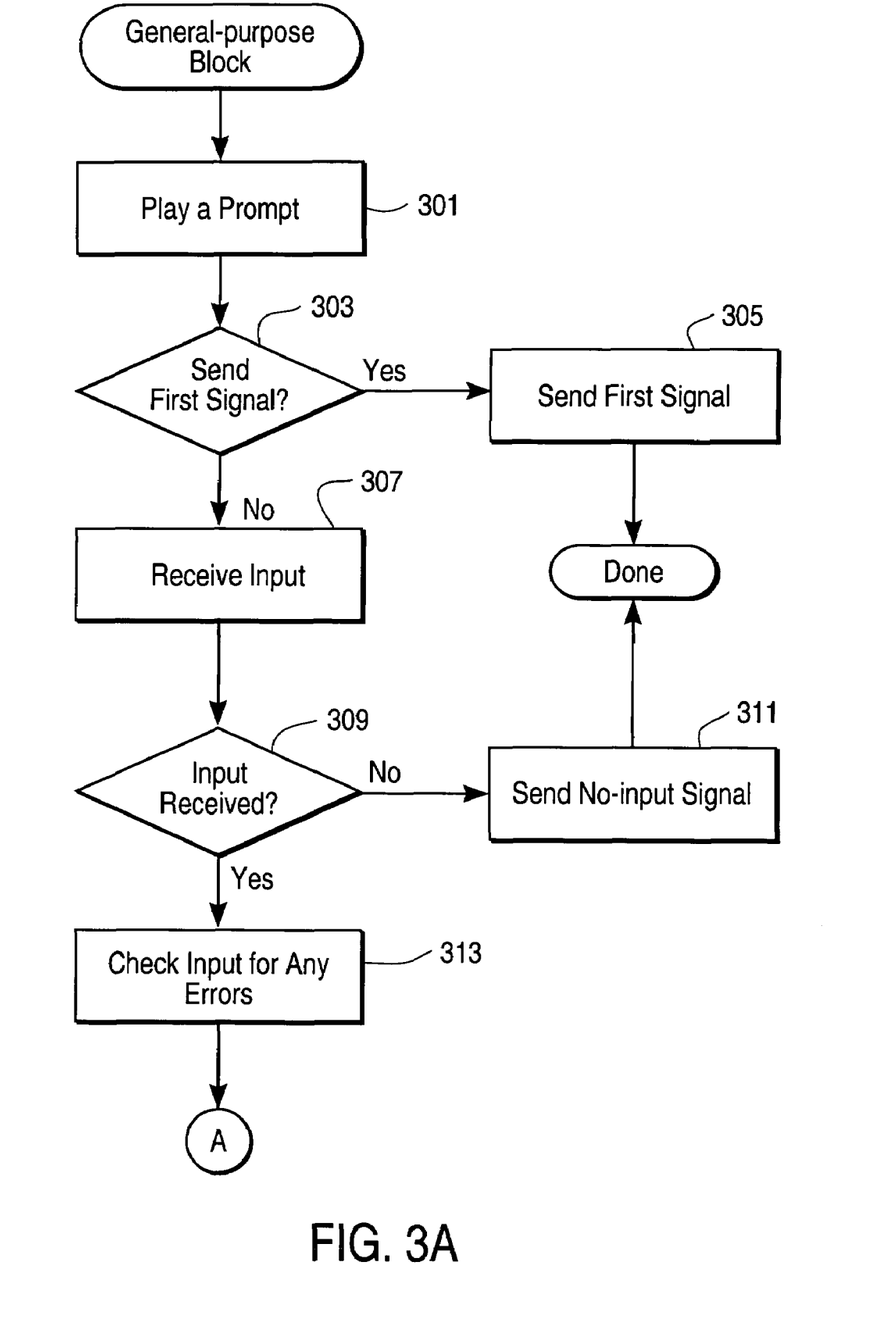
FIGS. 3A and 3B show a flow chart of a process that a general-purpose block can execute in an IVR application.
Figure 3B:
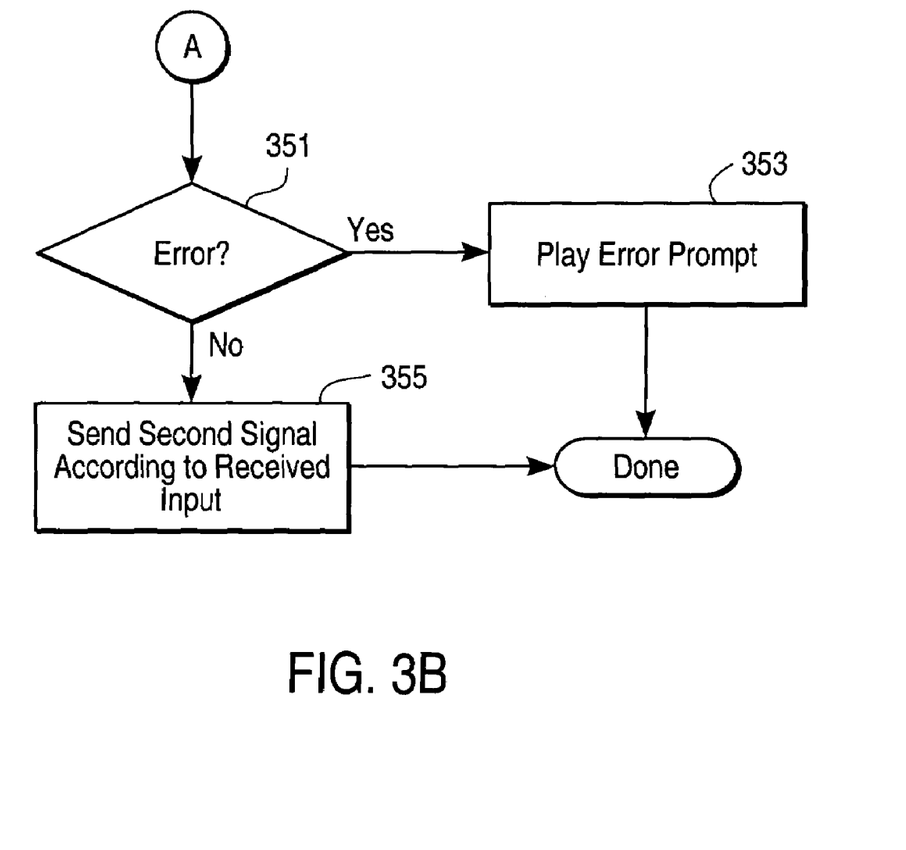

FIGS. 2A–2B show the overall functional structure of embodiments of a general-purpose block. It may be now beneficial to describe a process that a general-purpose block can execute. FIGS. 3A and 3B show a flow chart of a process that a general-purpose block can execute.

At a step 301, the general-purpose block plays a prompt. The prompt may be played by accessing a file, e.g., a sound file, stored on a computer system as an example. Although step 301 indicates that a prompt is played, the prompt may also be null or undefined so that the prompt does not actually provide an audible message to the user.

After the prompt is played, the general purpose block determines if it should send a first signal at a step 303. If it is determined that the general-purpose block should send the first signal, the block sends the signal at a step 305. Otherwise, the general-purpose block receives input at a step 307. The input can include individual keys or a string of keys, possibly delineated by a specific key. At a step 309, it is determined whether input was received in a predetermined amount of time. If no input was received in the predetermined amount of time, the general-purpose block sends a no-input signal at a step 311.

Once input has been received, the general-purpose block checks the input for any errors at a step 313. At a step 351, it is determined whether there is an error in the input. If there is an error, the general-purpose block plays an error prompt at a step 353. Otherwise, the general-purpose block sends a second signal according to the received input at a step 355.

FIGS. 2A–2B and 3A–3B have been described in reference to a single general-purpose block. It may be beneficial now to describe how multiple general-purpose blocks can be interconnected to generate an IVR application. In some embodiments, an IVR application is generated solely with the use of general-purpose blocks. However, in a preferred embodiment, function-specific blocks including start blocks and transfer blocks are utilized as shown in FIG. 4.

Figure 4:
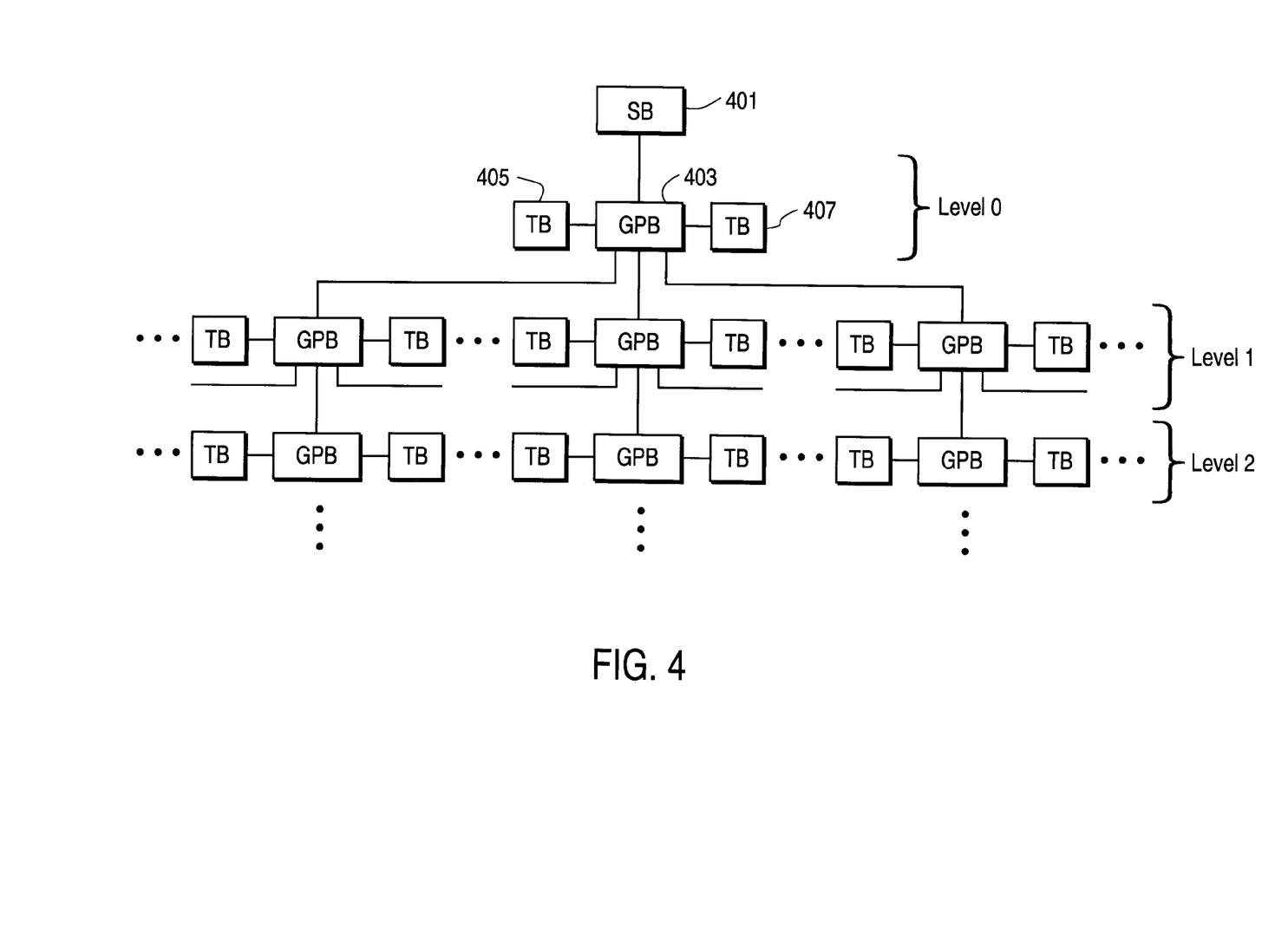
FIG. 4 shows multiple interconnected general-purpose blocks and includes start and transfer blocks.

FIG. 4 shows multiple general-purpose blocks interconnected to form an IVR application 400. A start block (SB) 401 performs the general initialization for the IVR application and waits for an incoming call. Once a call is received, SB 401 can send a signal to a general-purpose block (GPB) 403 to start the IVR operation.

GPB 403 can be a general-purpose block as described in reference to FIGS. 2A–2B. The InitEnd signal, if so configured, can be sent from GPB 403 to a transfer block (TB) 405 and the NoInputEnd signal can be sent from GPB 403 to a TB 407. Transfer blocks are function-specific blocks that operate to transfer a call to a specified or configured telephone number and then to terminate the IVR operation. Accordingly, transfer blocks operate to transfer the telephone call. As a very simple example, assume one wanted to configure a general-purpose block to play a particular prompt and then transfer the phone call to another number, such as a voicemail box. For this example, the general-purpose block can be configured to play a prompt notifying the user that they are being transferred to another number (for example, the GPB would be configured such that box 204 in FIG. 2A would be open and box 206 would be closed with an "X") and the InitEnd signal can be sent to TB 405, which would be configured to transfer the call to the desired telephone number. GPB 403 can send signals according to received input as described in reference to FIGS. 2A–2B. The signals sent according to the received input are sent to other general-purpose blocks as indicated in FIG. 4. Accordingly, GPB 403 and its associated transfer blocks 405 and 407 can be thought of as a first level (level 0). GPBs (and their associated transfer blocks) that receive signals from GPB 403 can be thought of as a second level (level 1). In any particular level, the GPBs can be identified by its level number and a node number. For example, the first GPB (far left side of FIG. 4) in level 1 would be GPB(1, 1) and the last GPB (far right side of FIG. 4) in level 1 would be GPB(1, n). GPBs (and their associated transfer blocks) that receive input from the general-purpose blocks of level 1 can be thought of as level 2, and so forth. Each GPB can be accordingly configured as discussed below as desired. In this way, an IVR application can be generated from general-purpose blocks that are interconnected and configured for the desired IVR application.

Figure 5:
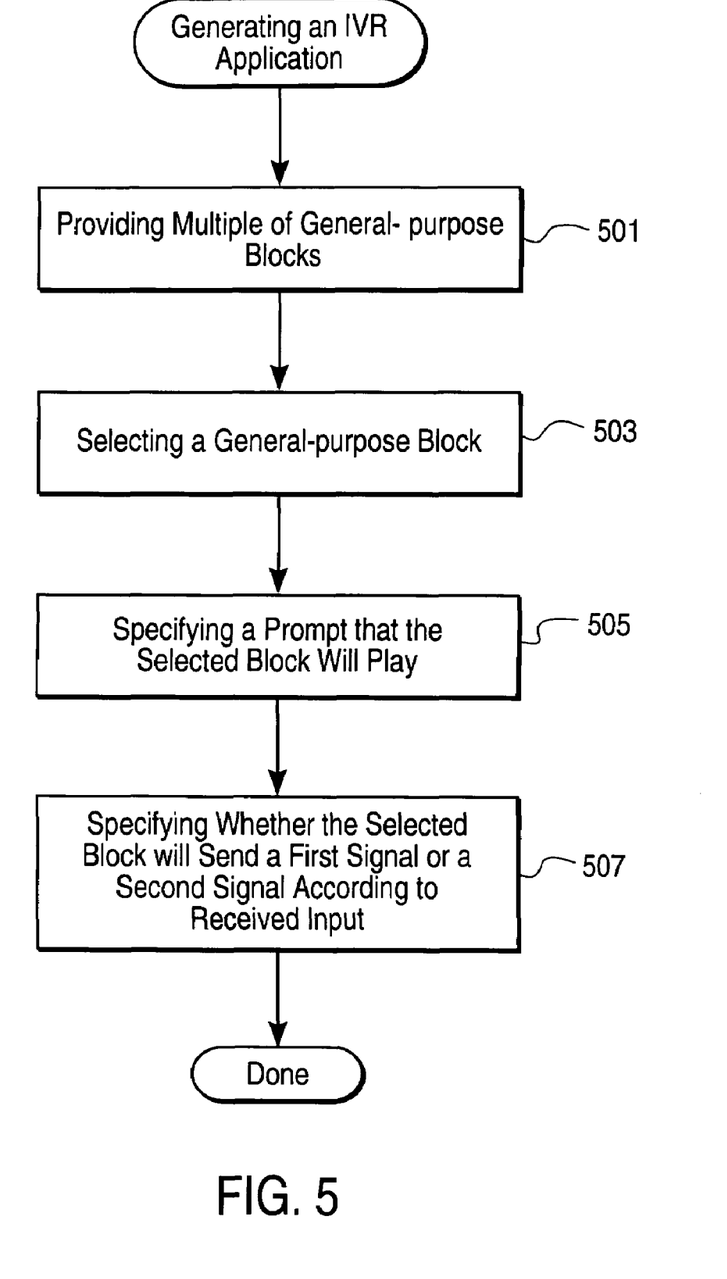
FIG. 5 shows a flow chart of a process of generating an IVR application.

In particular, FIG. 5 shows a flow chart of a process of generating an IVR application utilizing general-purpose blocks. At a step 501, multiple general-purpose blocks are provided. The interconnected general-purpose blocks can be as described in reference to FIGS. 2A–2B and may be a preconstructed network of general-purpose blocks. The interconnected general-purpose blocks could be thought of as the framework that can be configured to build a desired IVR application. At a step 503, a general-purpose block is selected. The general-purpose block that is selected is the block that the user desires to configure for this particular IVR application. At a step 505, a prompt that the selected block will play is specified. As mentioned earlier, the prompt can be specified by the name of a sound file stored in memory or on disk. At a step 507, it is specified whether the selected general-purpose block will send a first signal after the prompt is played or a second signal according to received input after the prompt is played.

As described, FIG. 5 shows the configuration of a few parameters of a general-purpose block. It should be understood by those of skill in the art that the process may be repeated for multiple general-purpose blocks. Additionally, each general-purpose block can include more or less parameters. In a preferred embodiment, each general-purpose block can be configured according to the following parameters: InitPlay prompt, ErrorPlay prompt, and NoInputPlay prompt. These prompts may be configured or specified for each particular general-purpose block. Additionally, each general-purpose block can be configured to send the InitEnd prompt after playing the InitPlay prompt or sending a signal according to received input after the InitPlay prompt is played.

Each general-purpose block can be configured to process received input. In a preferred embodiment, the valid input for a general-purpose block is configured utilizing a table of input and corresponding valid output (i.e., signals generated according to the input). One way that a general-purpose block may be configured with these parameters, even during run-time, will be described in more detail in reference to FIG. 7. However, it may be first beneficial to describe a very simple example of an IVR application of the present invention.

Figure 6:
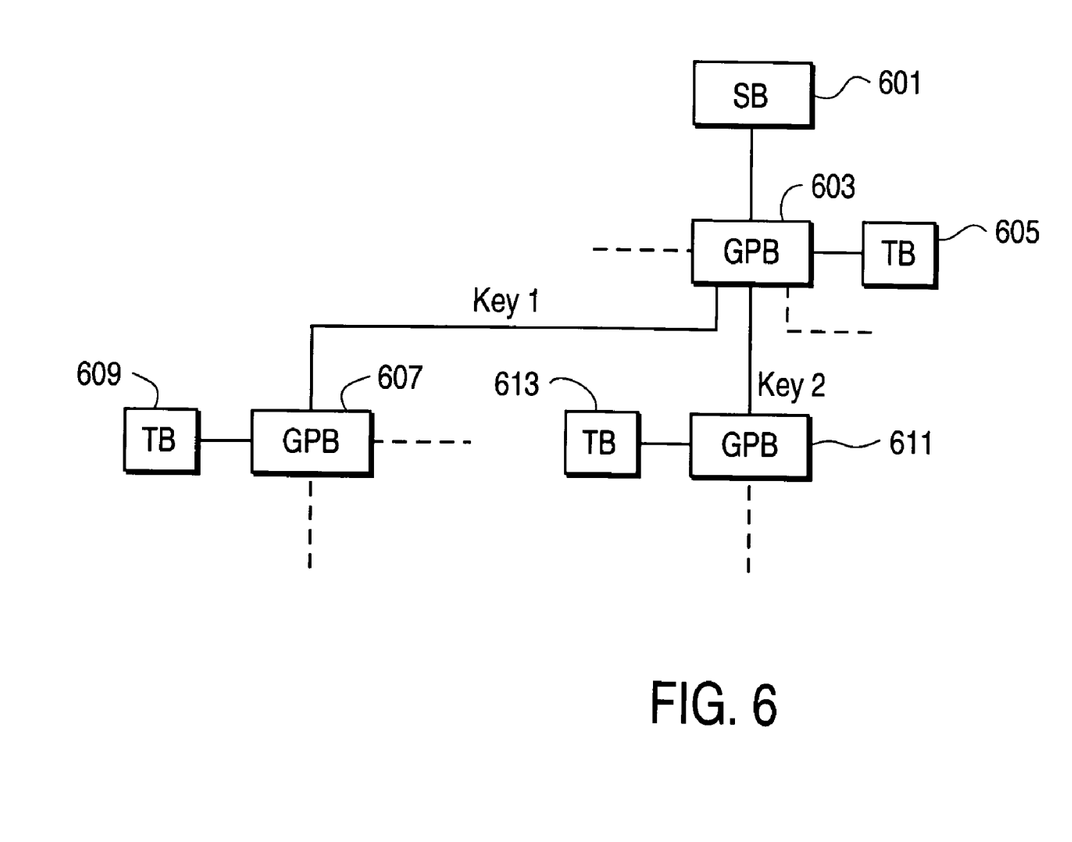
FIG. 6 shows a subset of the blocks that can be configured to implement a simple example of an IVR application.

FIG. 6 shows a simple example of an IVR application. The IVR application simply answers a telephone call with a welcome greeting. The user then hears a prompt that provides a two option menu, which the user may select with either key "1" or a key "2." Once the user has selected one of the menu options, the user hears a prompt that the telephone call will be transferred to the location specified and then the telephone call is transferred.

For simplicity, FIG. 6 only shows the general purpose blocks and transfer blocks that have been configured to implement the above-described IVR application. A SB 601 performed the general initialization for the IVR application. A GPB 603 is configured such that the InitPlay prompt is the general greeting and provides a menu for the user. For example, the greeting can be "welcome to company XYZ." GPB 603 can be configured so that it sends signals according to received input and the menu could be "press 1 for sales and press 2 to leave a message." In this simple example, the valid input includes the keys "1" and "2." However, if a user does not provide valid input in a predetermined amount of time (such as when the user is not utilizing a touch tone phone), GPB 603 can be configured with a NoInputPlay prompt that instructs the user that they will be transferred to a voice mail box. In this situation, GPB 603 may send a NoInputEnd signal to a TB 605 that transfers the telephone call to a voicemail box.

GPB 603 can process any received input and be configured to play an ErrorPlay prompt if the received input is not valid. GPB 603 can be configured to receive only keys "1" and "2" as valid input in accordance with the menu provided to the user.

Seen in FIG. 6, GPB 607 is a general-purpose block that receives a signal when the user inputs key "1" indicating that the user desires the first menu option, which in this example is for sales. GPB 607 can be configured to play an InitPlay prompt that tells the user that they are being transferred to sales. GPB 607 can then be configured to send an InitEnd signal to a TB 609. TB 609 is configured to transfer the call to the telephone number for sales. In some embodiments, the transfer blocks have a default value for the telephone numbers to which they transfer calls. A GPB 611 and a TB 613 can be configured in a similar manner to transfer a telephone call into a general voice mail box which is indicated by the menu selection "2". Although the IVR application described is very simple, it illustrates that very complex IVR applications can be generated by configuring preconnected general-purpose blocks.

Figure 7:
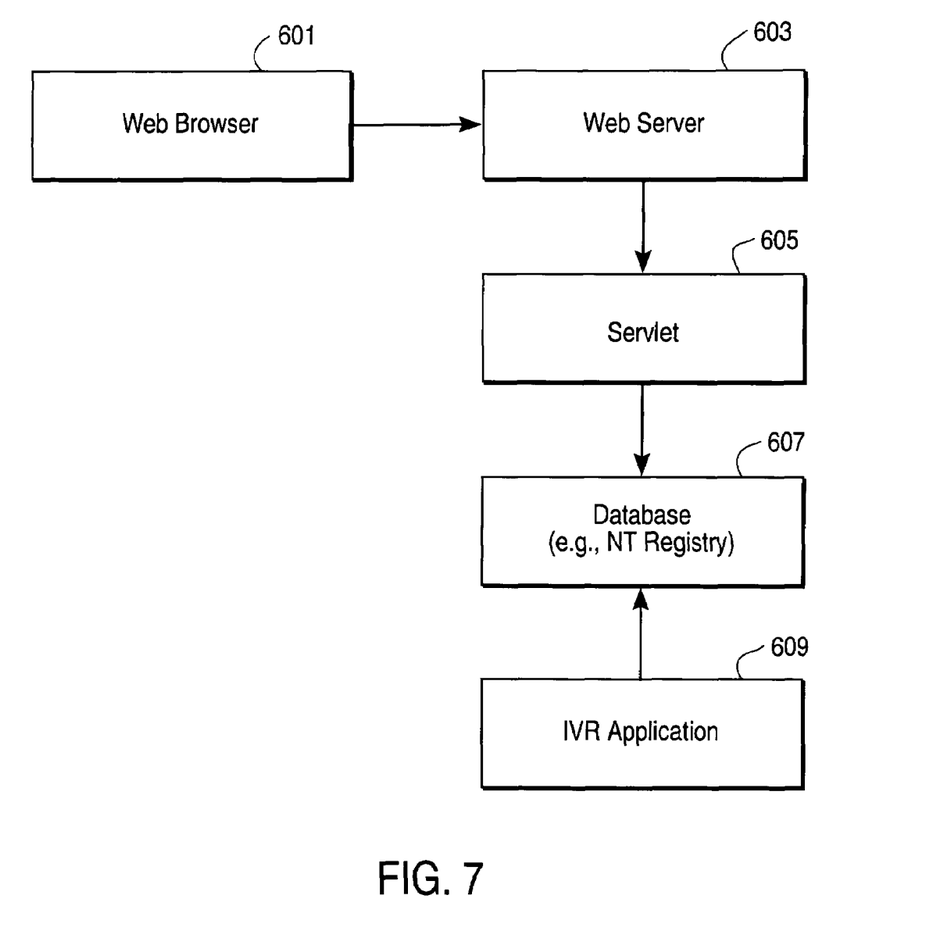
FIG. 7 shows a system that can be utilized to modify an IVR application while it is running.

An advantage of a preferred embodiment of the invention is that the general-purpose blocks can be configured during run-time. FIG. 7 shows a block diagram of a system that allows the general-purpose blocks to be configured during run-time in an object-oriented environment. A web browser 601 is utilized by a user to access a web server 603. Web server 603 allows the user to input the parameters for a specific general-purpose block. The specific general-purpose block can be identified by the level of the block (see FIG. 4) and the location of the block within the level. Additionally, the parameters for the general-purpose block can be specified as described above.

Once the user specifies one or more parameters for a particular general-purpose block, web server 603 generates a servlet 605. Servlet 605 takes the parameters for the particular general-purpose block and stores them in a database 607. In a preferred embodiment, database 607 is a WINDOWS NT registry.

During execution, an IVR application 609 checks database 607 for new parameters for the general-purpose blocks. IVR application 609 can become aware of new parameters in a number of different ways. For example, an object can be created that continually monitors database 607 and sends a signal to IVR application 609 when the database has been modified. As another example, each general-purpose block of IVR application 609 can check the database before executing to determine if its parameters have been modified. By allowing a user to modify parameters of a general-purpose block during run-time, it is not necessary to terminate or bring down the IVR application in order to upgrade or maintain the IVR application.

Figure 8:
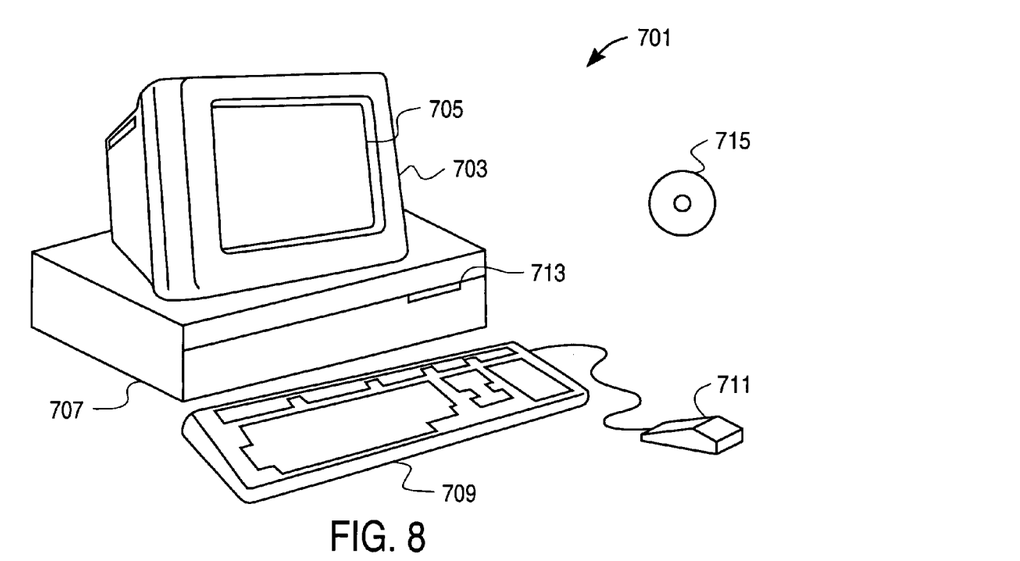
FIG. 8 illustrates an example of a computer system that can be utilized to execute the software of an embodiment of the invention.

FIG. 8 illustrates an example of a computer system that can be used to execute the software of an embodiment of the invention. FIG. 8 shows a computer system 701 that includes a display 703, screen 705, cabinet 707, keyboard 709, and mouse 711. Mouse 711 can have one or more buttons for interacting with a graphical user interface. Cabinet 707 houses a CD-ROM drive 713, system memory and a hard drive (see FIG. 9) which can be utilized to store and retrieve software programs incorporating computer code that implements the invention, data for use with the invention, and the like. Although CD-ROM 715 is shown as an exemplary computer-readable storage medium, other computer-readable storage media including floppy disk, tape, flash memory, system memory, and hard drive can be utilized. Additionally, a data signal embodied in a carrier wave (e.g., in a network including the Internet) can be the computer-readable storage medium.

Figure 9:
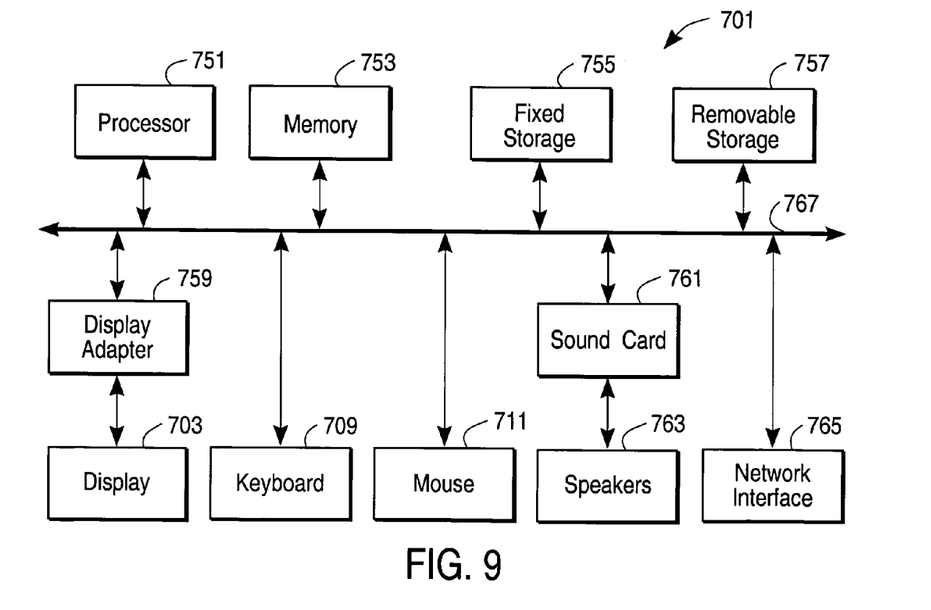
FIG. 9 illustrates a system block diagram of the computer system of FIG. 8.

FIG. 9 shows a system block diagram of computer system 701 used to execute the software of an embodiment of the invention. As in FIG. 8, computer system 701 includes monitor 703 and keyboard 709, and mouse 711. Computer system 701 further includes subsystems such as a central processor 751, system memory 753, fixed storage 755 (e.g., hard drive), removable storage 57 (e.g., CD-ROM drive), display adapter 759, sound card 761, speakers 763, and network interface 765. Other computer systems suitable for use with the invention can include additional or fewer subsystems. For example, another computer system could include more than one processor 751 (i.e., a multi-processor system) or a cache memory. The system bus architecture of computer system 701 is represented by arrows 767. However, these arrows are illustrative of any interconnection scheme serving to link the subsystems. For example, a local bus could be utilized to connect the central processor to the system memory and display adapter. Computer system 701 shown in FIG. 9 is but an example of a computer system suitable for use with the invention. Other computer architectures having different configurations of subsystems can also be utilized.

While the above is a complete description of preferred embodiments of the invention, various alternatives, modifications and equivalents can be used. It should be evident that the invention is equally applicable by making appropriate modifications to the embodiments described above. Therefore, the above description should not be taken as limiting the scope of the invention that is defined by the following claims along with their full scope of equivalents.

What is claimed is:

1. An interactive voice response system, comprising:
a plurality of general-purpose blocks, each general-purpose block being coupled to at least one other general-purpose block, wherein each general-purpose block plays a prompt and is configurable to at least two configurations, one configuration sends a first signal without requiring input after playing the prompt and another configuration sends a second signal according to received input after playing the prompt; and
a plurality of transfer blocks, each transfer block being coupled to a general-purpose block to receive one of the first or second signals and is configurable to transfer a call to a specified telephone number.

2. The system of claim 1, wherein each general-purpose block plays a prompt by accessing a sound file.

3. The system of claim 2, wherein the sound file accessed by each general-purpose block can be configured.

4. The system of claim 1, wherein if a general-purpose block is configured to send the second signal according to received input, the general-purpose block receives the input.

5. The system of claim 4, wherein the general-purpose block receives the input by receiving dual tone multiple frequency (DTMF) input.

6. The system of claim 5, wherein the DTMF input represents a key or a string of keys.

7. The system of claim 4, wherein the general-purpose block plays a no-input prompt if the general-purpose block does not receive the input within a predetermined amount of time.

8. The system of claim 4, wherein the general-purpose block processes the received input by selecting the second signal according to the received input.

9. The system of claim 4, wherein the general-purpose block determines if there was an error in the received input.

10. The system of claim 9, wherein the general-purpose block sends an error prompt if there was an error in the received input.

11. The system of claim 10, wherein the general-purpose block continues receiving the input after the error prompt is played.

12. The system of claim 10, wherein the general-purpose block plays the prompt after the error prompt is played.

13. The system of claim 1, wherein the second signal from a first general-purpose block is received by a second general-purpose block.

14. The system of claim 1 wherein a function of each general purpose block changes depending on whether the general purpose block is configured to the configuration that sends the first signal or the configuration that sends the second signal.

15. A method of generating an interactive voice response application, comprising:
providing a plurality of general-purpose blocks, each general-purpose block being preconfigured to send signals to at least one other general-purpose block;
selecting a general-purpose block;
specifying a prompt that the selected general-purpose block will play;
specifying one of two configurations, where in one configuration the selected general-purpose block will send a first signal without requiring input after playing the prompt and in another configuration the selected general-purpose block will send a second signal according to received input after playing the prompt;
providing a plurality of transfer blocks, each transfer block being coupled to a general-purpose block to receive one of the first or second signals to transfer a call to a telephone number;
selecting a transfer block; and
specifying the telephone number for the selected transfer block.

16. The method of claim 15, wherein specifying a prompt that the selected general-purpose block will play includes specifying a sound file that stores the prompt.

17. The method of claim 15, further comprising specifying the input that is to be received if it is specified that the second signal will be sent.

18. The method of claim 17, wherein the received input is dual tone multiple frequency (DTMF) input.

19. The method of claim 18, wherein the DTMF input represents a key or a string of keys.

20. The method of claim 15, further comprising specifying a no-input prompt that the selected general-purpose block will play if no input is received within a predetermined amount of time.

21. The method of claim 15, further comprising specifying an error prompt that the selected general-purpose block will play if there is an error in the received input.

* * * * *